United States Patent [19]

Nishikata et al.

[11] Patent Number: 4,644,909
[45] Date of Patent: Feb. 24, 1987

[54] SYSTEM FOR COOLING INTERNAL COMBUSTION ENGINES

[75] Inventors: Masahiro Nishikata, Tokyo; Masato Nozaki, Kawasaki, both of Japan

[73] Assignee: Aisin Seiki Kabushiki Kaisha, Kariya, Japan

[21] Appl. No.: 731,894

[22] Filed: May 8, 1985

[30] Foreign Application Priority Data

May 10, 1984 [JP] Japan ............................ 59-93569

[51] Int. Cl.⁴ ............................................ F01P 7/16
[52] U.S. Cl. .................................. 123/41.1; 236/34.5
[58] Field of Search ............. 123/41.02, 41.08, 41.09, 123/41.1; 236/34, 34.5, 84; 137/872, 876; 251/129.05, 129.11, 129.15

[56] References Cited

U.S. PATENT DOCUMENTS

| | | | |
|---|---|---|---|
| 4,388,913 | 6/1983 | Grimm et al. | 251/129.11 |
| 4,425,878 | 1/1984 | Samuel | 123/41.08 |
| 4,453,700 | 6/1984 | Otsuki et al. | 251/129.15 |
| 4,550,693 | 11/1985 | Saur | 123/41.1 |

Primary Examiner—William A. Cuchlinski, Jr.
Attorney, Agent, or Firm—Oblon, Fisher, Spivak, McClelland & Maier

[57] ABSTRACT

A system for cooling internal combustion engines, in which there is provided a main cooling water line, a by-pass cooling water line and a motor-driven valve mechanism for regulating the mixture ratio of the water from the above two cooling water lines. The operation of the motor-driven valve mechanism is controlled by an electric control circuit which receives the signal from a water temperature sensor positioned close to the water inlet to the engine and generates the control signal to be transmitted to the motor. The motor-driven valve has a spool which makes an up-down movement or a rotary movement to regulate the mixture ratio of water.

4 Claims, 14 Drawing Figures

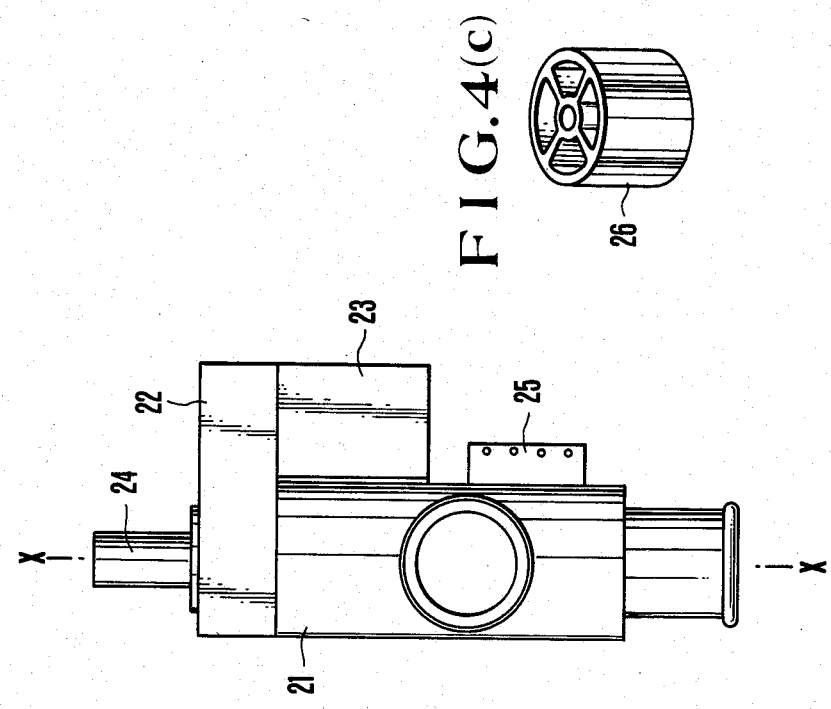
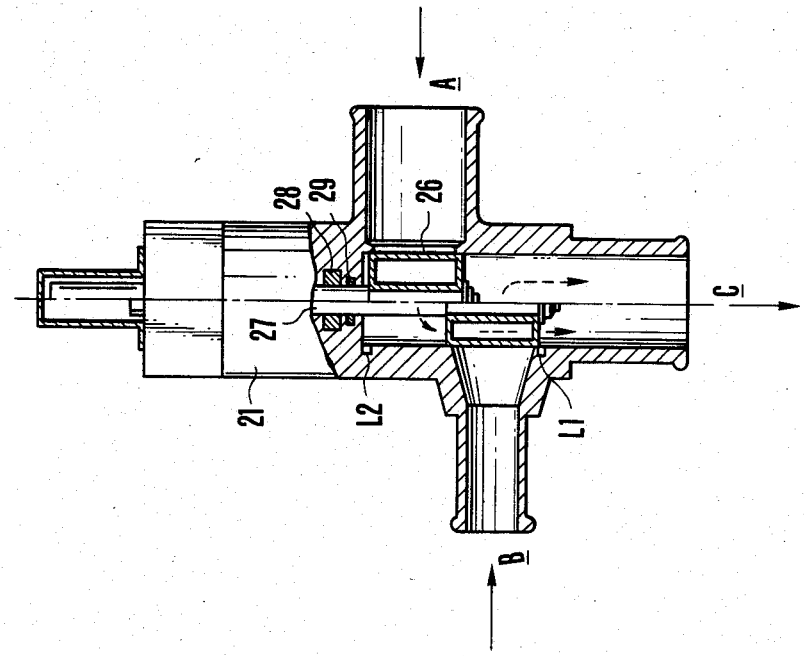

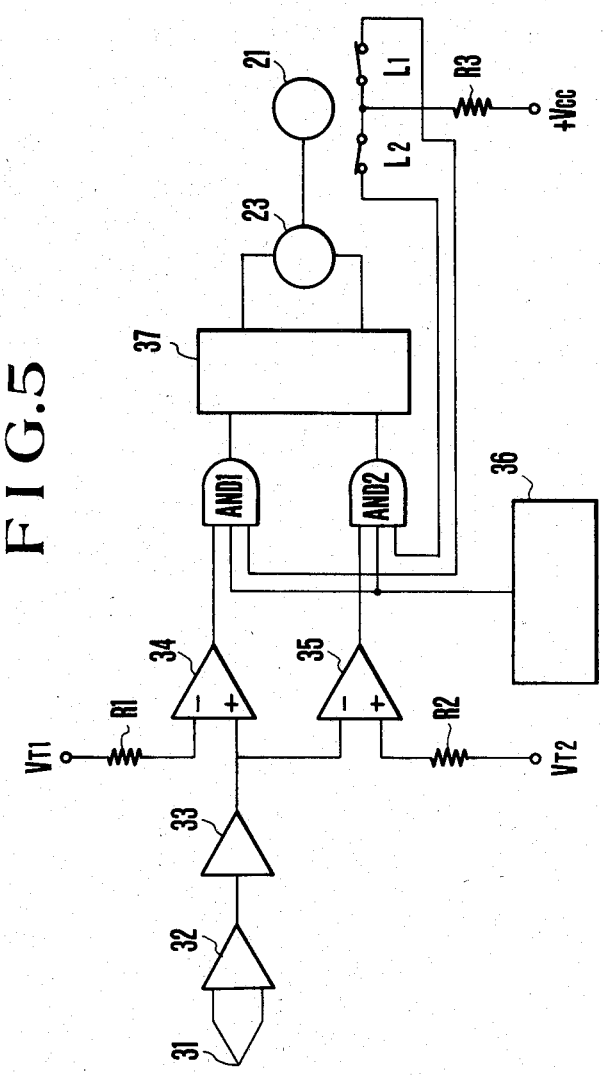
F I G. 5

SYSTEM FOR COOLING INTERNAL COMBUSTION ENGINES

BACKGROUND OF THE INVENTION

1. Field of the Invention

This invention relates to a system for cooling internal combustion engines, particularly to a cooling system in which the mixture ratio of the cooling water circulated through a radiator with the water circulated without passing through a radiator is controlled in accordance with the temperature of the cooling water supplied to the engine.

2. Prior Art of the Invention

In the conventional cooling system for water-cooled internal combustion engines the intercommunication between a main water line in which the water passes through a radiator and a by-pass water line in which the water circulates without passing through the radiator is controlled by a thermo-valve operated in accordance with the water temperature. Generally, a wax-type thermostat valve is used as the thermo-valve. However, the conventional controlling system using such wax-type thermo-valve has drawbacks which result from some special characters of the wax-type thermostat. Namely, since the wax-type thermostat operates responding to the meltage of wax contained therein, tne time for the response requires inevitably a somewhat long time (about 80 sec. in general). Consequently, the operation does not necessarily follow the rapid variation of conditions such as the engine load, and sometimes there are caused undesirable phenomena such as overheating at the time of going up a steep slope, a hot soak or a dead soak at the time of a sudden stop and an over-shoot at the time of a rapid start. Especially, in the running in a cold area, there occurs sometimes an over-shoot accompanied with hunting, which would shorten the life span of the engine and might cause the engine damage, unless the thermostat is replaced with a thermostat for the cold area. Furthermore, owing to the hysteresis character or the delay of response time, there comes inevitably some aberration of the temperature of cooling water, for instance, there is ordinarily an aberration of about $\pm 3°$ C. at the inlet to the engine even in a constant running condition. At the time of speed transition when the engine rotation is increasing rapidly, the thermostat is subjected to a strong fluid power and tends to over-open, which would decrease the temperature of the cooling water at the engine inlet excessively. Since the temperature for opening or closing the valve has to be fixed, it is impossible to choose an adequate water temperature according to or following the engine load, the HC amount in the exhaust gas or the fuel consumption rate. The wax contained in the thermostat, would leak out or be degraded during use. It takes often a long time to exhaust air from the valve at the time of pouring water thereinto, as the air-exhausting hole cannot but be rather small. On the contrary, the time for warming up the engine becomes long in a cold area, as the cooling water in the radiatorside often flows into the valve from the above a small airexhausting hole during engine stop.

BRIEF SUMMARY OF THE INVENTION

The object of the present invention is to provide an improved system for controlling the temperature of cooling water, which can resolve the foregoing problems of the wax type thermostat valve, especially can avoid the inconvenience of the time delay of valve operation.

In accordance with the present invention, the valve is controlled by a motor which operates in response to the signal from a water-temperature sensor. The motor-driven valve is arranged before a water pump, and the water temperature sensor is arranged at a position between the water pump and the cooling water inlet to the engine. In order to control the opening degree of the valve so as to accord with the output of the sensor and thereby to determine the intercommunicating condition between the main water line and the by-pass water line, a control means such as a control circuit is arranged in the system. The control circuit receives the signal of the detected temperature from the sensor and generates a signal for determining the rotation direction and the rotation degree of the motor, whereby the opening-closing operation of the valve is controlled in accordance with the water temperature.

As for the motor-driven valve mechanism for the system of the present invention, various kinds of valves, besides the valves having such structures as mentioned in the embodiments, may be used, provided that they are suitable for electrical opening-closing operation. For instance, the valve body may be placed either only at a position connecting the main water line with the by-pass water line or in each of the two water lines. As for the motor for driving the valve mechanism, a direct current motor or a stepping motor can be used. The use of the stepping motor has an effect to reduce the size of the valve structure. In the embodiments mentioned in the attached drawings, the temperature sensor such as a thermo-couple or a thermistor is used. However, various sensors which have a linear output character can be used as the sensor for the present invention. The sensors which do not necessarily have a linear output character can be also used, in the case where the rate of the valve-opening is set up so as to compensate such sensor character.

By employing such configuration of the valve mechanism and controlling means as stated above, it is possible to operate the cooling system so that the water from the main water line and the water from the by-pass water line are mixed up at an optional ratio, always following the change of various conditions such as engine load, etc. without being accompanied with the time delay as in the wax-type thermostat. Thus, the temperature of the cooling water at the inlet to the engine is maintained always at a desired degree and an undesirable phenomena such as an over-shoot with hunting can be avoided.

The foregoing and other objects, features and advantages of the present invention will be understood more clearly and fully from the following detailed description of preferred embodiments with reference to the attached drawing.

BRIEF DESCRIPTION OF THE DRAWINGS

FIG. 4(a) through FIG. 4(c) show one embodiment of the motor-driven mixture valve in accordance with the present invention, FIG. 4(a) showing the side sectional view, FIG. 4(b) showing a partial cross-sectional view taken on the line X—X in FIG. 4(a), and FIG. 4(c) showing the perspective view of the spool for the motor-driven valve.

FIG. 5 shows a controlling circuit for the embodiment of FIG. 4.

DETAILED DESCRIPTION OF THE INVENTION

Figure 1:
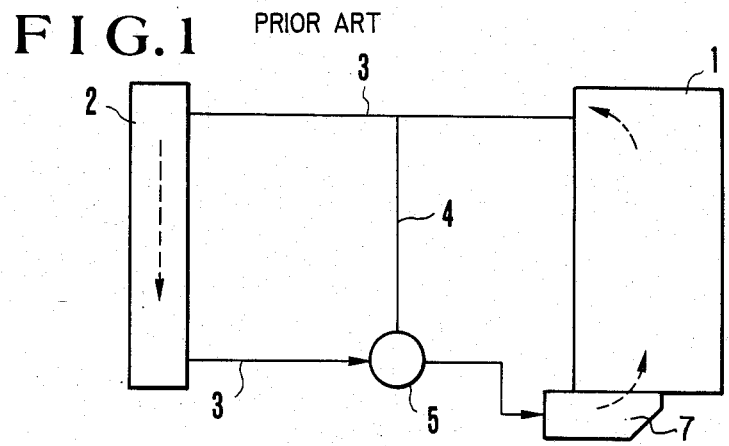
FIG. 1 shows a schematic outline of the conventional cooling system for a water-cooled engine.

Referring to FIG. 1, which shows a model of the conventional cooling system for a water-cooled engine using a wax-type thermostat, the cooling water circulates in a main water line 3 connecting an engine 1 and a radiator 2 for radiating the engine heat into the air. A by-pass water line 4 is provided, being diverged from the main water line 3 in order to circulate a part of the cooling water to the inlet of the engine directly without passing through the radiator 2. The intercommunication between the main water line 3 and the by-pass water line 4 is made by a mixture valve 5 using a wax-type thermostat, and the extent of the intercommunication depends on the opening degree of the valve in response to the temperature detected by the thermostat. The mixture of the water from the main water line 3 and the water from the bypass water line 4 was sent to the engine 1 by a water pump 7.

Figure 2:
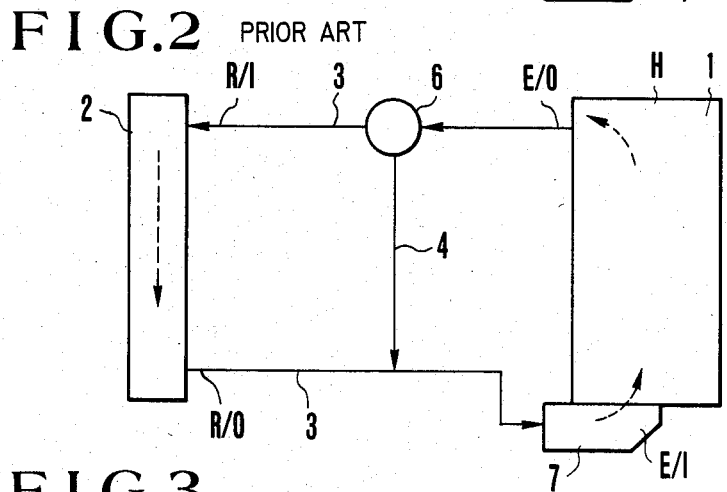
FIG. 2 shows a schematic outline of another model of the conventional cooling system for a water-cooled engine.

In FIG. 2, which shows another model of the conventional cooling system, the distribution valve 6 using a wax-type thermostat is arranged at a position close to the water outlet of the engine, contrary to the model in FIG. 1 in which the mixture valve is arranged at the downstream-side of the by-pass water line. In this model, too, the mixture ratio between the water from the main water line 3 and the water from the by-pass water line 4 depends on the opening degree of the valve responding to the temperature detected by the thermostat.

Figure 3:
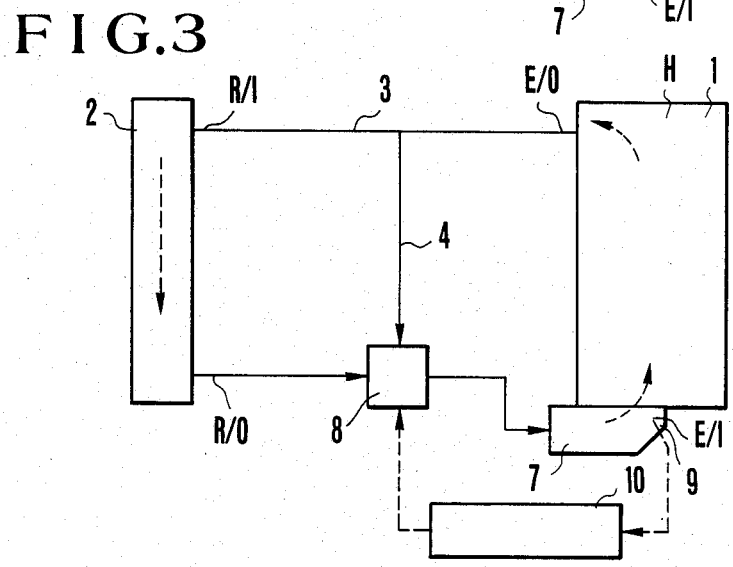
FIG. 3 shows a schematic outline of the cooling system for a water-cooled engine, in accordance with the present invention.

Referring now to FIG. 3, which shows a schematic outline of the cooling system of the present invention, the engine 1, the radiator 2, the main water line 3, the by-pass water line 4 and the water pump 7 are arranged as same as in the conventional system. However, a motordriven mixture valve 8, a water temperature sensor 9 and a controller 10 are newly provided in this system. The purpose of employing these members are as stated in the foregoing, and the detailed structure and function of them will be explained in the following.

In the first embodiment of the motor-driven mixture valve in accordance with the present invention, shown in FIG. 4(a) through FIG. 4(c), a valve body 21 has a clutching mechanism which converts the rotation of a direct current motor 23 to the up-down movement of a shaft 27 by the function of a gear box 22 for reducing the rotation speed of the direct current motor 23. Outside the valve body 21, there is arranged a connector 25 connected electrically to the direct current motor 23. The end of the shaft 27 it is covered by a shaft cover 24. As shown in FIG. 4(a), the direct current motor 23, the reduction gear box 22 and the valve body 21 constitute a mixture valve.

In the valve body 21, a spool 26, which has a cylindrical shape as shown in FIG. 4(c) and is fixed to the shaft 27, can make a sliding up-and-down movement between a radiator-side opening A and a by-pass-side opening B. This movement of the spool 26 can vary the opening degree of the radiator-side opening A and the by-pass-side opening B, thereby to control the mixture ratio of the water supplied from the main water line to the water supplied from the by-pass water line. In FIG. 4(b), its right-side portion shows a full-opened situation of the by-pass water line, and its left-side portion shows a full-opened situation of the main water line.

A controller usable to the valve of FIG. 4 is shown in the circuit diagram of FIG. 5. In this circuit, a CA-type thermo-couple is used as the water temperature sensor provided at a position close to the water inlet to the engine. If the output of the CA-type thermo-couple is of a non-linear character, it is input to a temperature compensation amplifier 32. It is of course possible that the temperature compensation amplifier 32 can be omitted in some cases, considering the character of the sensor or the thermo-couple. The output of the temperature compensation amplifier 32 is input to a valve-opening comparator 34 or to a valve-closing comparator 35, after being amplified to an adequate level by an amplifier 33. A valve-opening temperature, determined by the input voltage $VT_1$ and the resistance value of a resistor $R_1$, is set up for the valve-opening comparator 34, while a valve-closing temperature is determined by the input voltage $VT_2$ and the resistance value of a resistor $R_2$, is set up for the valveclosing comparator 35. It is desirable that the difference between the valve-opening temperature and the valve-closing temperature is about 2° C. through 3° C., as a difference more than that range might cause a hunting of the water temperature. The outputs of the valve-opening comparator 34 and the valve-closing comparator 35 are conducted to an AND-gate $AND_1$ and an AND-gate $AND_2$ respectively to open or close them. The output of a square-wave generator 36 is also conducted to the AND-gate $AND_1$ and the AND-gate $AND_2$. Further, the limit signal of a valve-opening limit switch $L_1$, which operates when the movement of the spool 26 in the valve body 21 reaches the lower limit, is input to the AND-gate $AND_1$, while the limit signal of a valve-closing limit switch $L_2$ which operates when the movement of the spool 26 in the valve body 21 reaches the upper limit is input to the AND-gate $AND_2$. Ordinarily, the valve-opening limit switch $L_1$ and the valve-closing limit switch $L_2$ are closed; and the H (High) level is conducted from a power supply $+Vcc$ to the AND-gates $AND_1$ and $AND_2$ through a resistor $R_3$ to open the AND-gates $AND_1$ and $AND_2$. However, when the spool 26 moves to a position of its upper limit or lower limit, the valve-opening limit switch $L_1$ or the valve-closing limit switch $L_2$ is opened and AND-gate $AND_1$ or the AND-gate $AND_2$ is closed.

A motor-driving circuit 37 rotates the direct current motor 23 and moves the spool 26 downwardly when the valve-closing signal is generated, namely, when the output of the square wave generator 36 is supplied to the motor 23 through the AND-gate $AND_1$. On the contrary, when the valve closing signal is generated, namely, when the output of the square-wave generator 36 is supplied to the motor 23 through the AND-gate $AND_2$, the motor-driving circuit 37 rotates the motor 23 reversely and moves the spool 26 upwardly.

Consequently, the controller of FIG. 5 operates as follows:

When there occurs the rising of the temperature of cooling water at a position close to the inlet to the engine, the output of the CA-type thermo-couple 31 increases and the output of the valve-opening comparator 34 becomes an H level. Since the square-wave generator 36 is always in a generating situation and the valve-opening limit switch $L_1$ is ordinarily closed, the AND-gate $AND_1$ opens and the output of the square-wave generator 36 is input to the motor-driving circuit 37 when the output of the valve-opening comparator becomes the H level.

The direct current motor 23 rotates steppingly in accordance with the output of the square wave generator 36, thereby to conduct the cooling water in the radiatorside opening A to the engine-side opening C through the spool 26. This causes the reduction of the volume of the cooling water flowing from the by-pass-side opening B to the engine-side opening C and the increase of the volume of the cooling water flowing from the radiatorside opening A to the engine-side opening C. When the downward movement of the spool 26 by the direct current motor 23 reaches the lower limit, the AND-gate $AND_1$ is closed by the function of the valve opening limit switch $L_1$, and the direct current motor 23 ceases to rotate.

On the contrary, when there occurs a fall of the temperature of cooling water at the position close to the inlet to the engine by a decrease of the engine rotation speed or the stoppage of the engine, the output of the CA-type thermo-couple 31 is reduced and the output of the valve-closing comparator 35 becomes an H level. Since the valve-closing limit switch $L_2$ is closed ordinarily, the AND-gate $AND_2$ opens and the direct current motor 23 rotates steppingly so as to elevate the spool 26. This reduces the opening degree of the radiator-side opening A and increases the opening degree of the by-pass-side opening B, whereby the ratio of the cooling water flowing through the by-pass water line is increased. When the movement of the spool 26 reaches the upper limit, the AND-gate $AND_2$ is closed by the function of the valve-closing limit switch $L_2$, and the direct current motor 23 ceases to rotate.

As stated above, the water-cooled engine is cooled through the control of the opening degree of the mixture valve connected to the direct current motor which is driven in accordance with the output of the CA-type thermocouple. Therefore, if the temperature for opening or closing the valve is controlled by such means as a microprocessor so that it corresponds to the HC amount in the exhaust gas or the fuel consumption rate, the temperature of the engine can be controlled so as to be always at a desired condition.

Figure 6A:
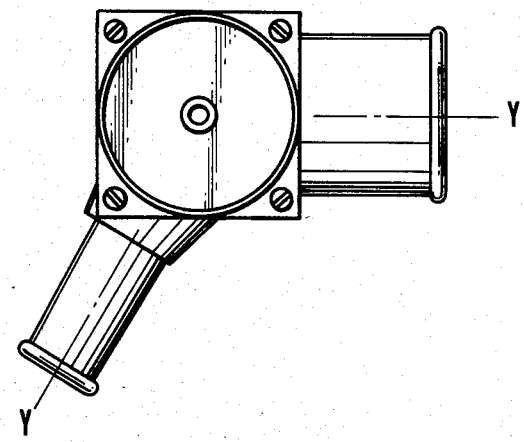
FIG. 6(a) through FIG. 6(d) show another embodiment of the motor-driven valve in accordance with the present invention, FIG. 6(a) showing the plan view, FIG. 6(b) showing the cross-sectional view taken on the line Y—Y in FIG. 6(a), FIG. 6(c) showing the cross-sectional view taken on the line Z—Z in FIG. 6(b)/and FIG. 6(d) showing the valve spool.
Figure 6B:
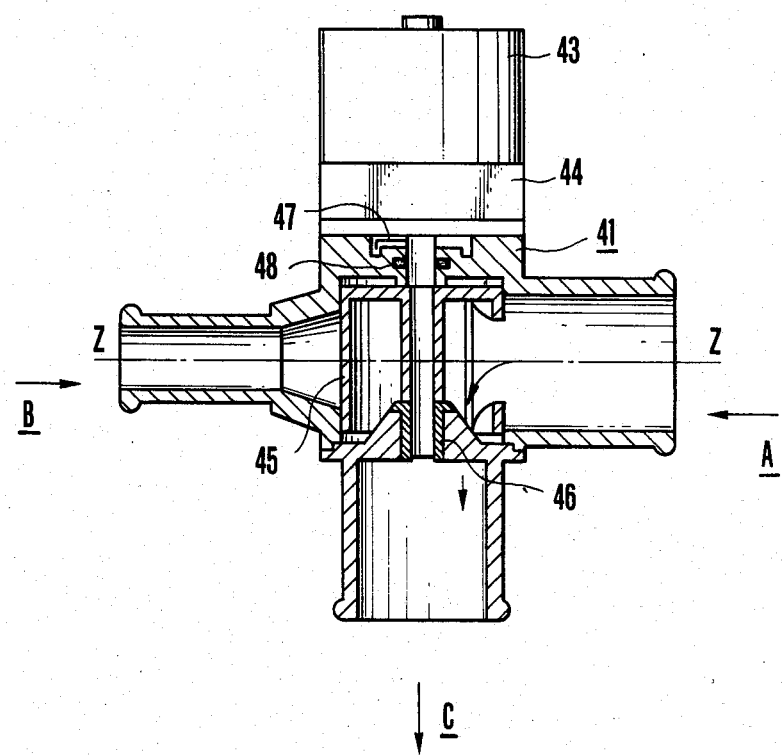
Figure 6C:
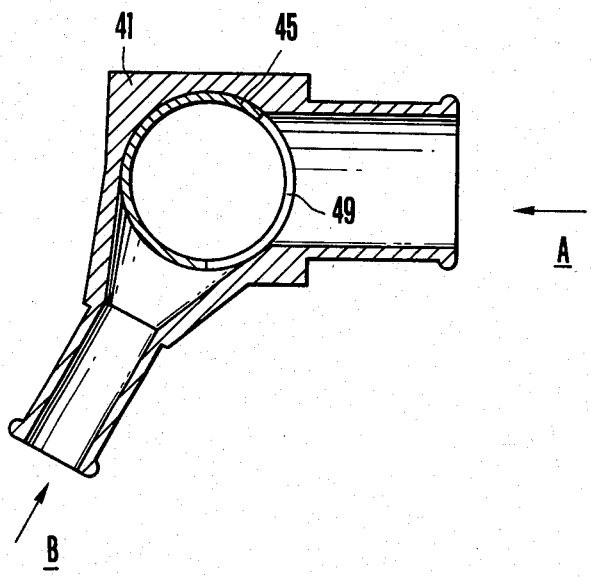
Figure 6D:
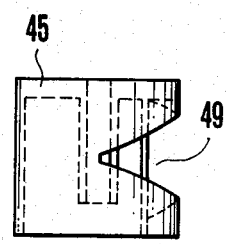

In the second embodiment of the motor-driven mixture valve shown in FIG. 6(a) through FIG. 6(c), there is arranged a rotary spool 45 fixed to the shaft of a gear box 44, for reducing the rotation speed of a stepping motor 43. The rotary movement of the rotary spool 45 causes a spool rotation limit member 47 having a same axis with the rotary spool to such a limit switch $L_3$ or $L_4$ (in FIG. 7) to detect the limit of the rightward or leftward rotary movement. As shown in FIG. 6(c) and (d), the rotary spool 45 has an opening 49 of a triangle shape on the circumference. The axis portion of the rotary spool 45 is sealed with an O-ring 48 to prevent the water leakage to the side of the reduction gear box 44, and a bush 46 is arranged at the one end of the axis portion.

FIG. 6(b) and (c) show a situation in which the mixture valve makes the cooling water to flow to the engine-side opening C mainly from the radiator-side opening A. In this situation, a relatively little volume of water is conducted from the by-pass-side opening B to the engine-side opening C through the end portion of the opening 49 of the rotary spool 45. The shape and the size of the opening 49 should be determined by such factors as the resistance in the main water line including a radiator portion, the resistance in the by-pass water line or in the engine, the capacity of the water pump, and the power of the engine.

Figure 7:
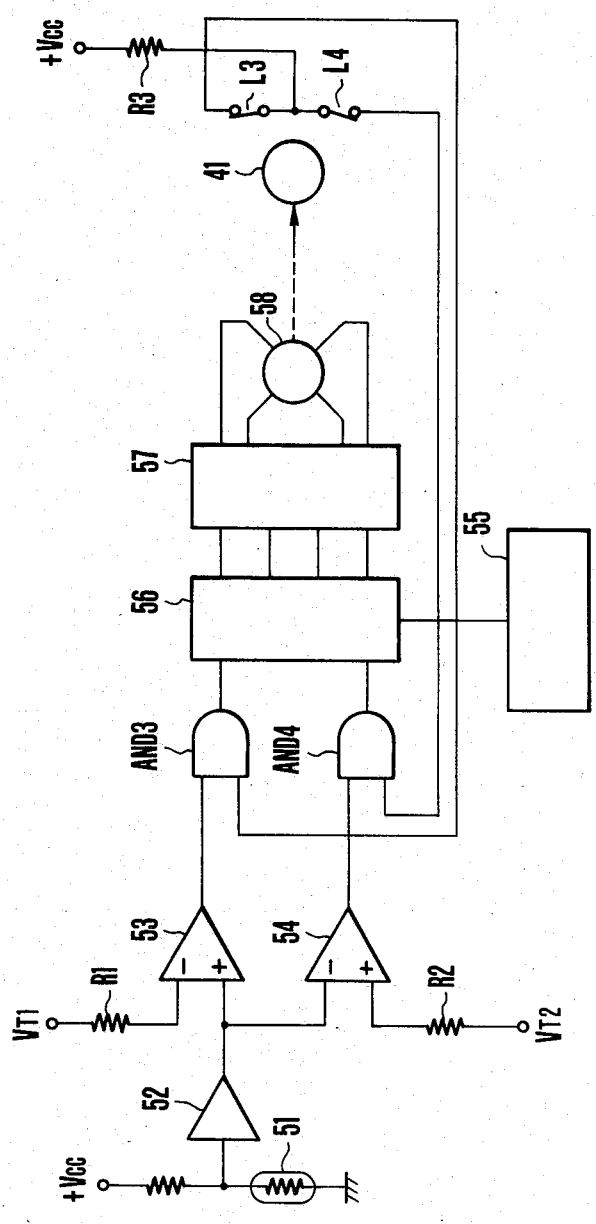
FIG. 7 shows a controlling circuit for the motor-driven valve of FIG. 6.

The mixture valve of FIG. 6 can be controlled by such control circuit as mentioned in FIG. 7. In the control circuit of FIG. 7, a thermistor 51 is arranged at a position close to the inlet to the engine, as a water temperature sensor. It is desirable to use the thermistor after treating it so that it can bear the use as the water temperature sensor, for instance, by inserting it into a metal case and filling up the case with plastic materials, because the thermistor is easy to be destroyed if it is used in a bare condition. However, it is necessary to fully take into account the character of the metal case or the filling materials and the assembling conditions of the sensor, so that the treatment of the thermistor does not excessively reduce the response capability of the sensor. The thermistor 51 is connected to a power supply +Vcc through a resistor $R_4$, and the output having a linear character responding to the variation of temperature is input to a valve-opening comparator 53 and a valve closing comparator 54 after being amplified by an amplifier 52. The valve-opening temperature, which is determined by the input voltage $VT_1$ and the resistance valve of the resistor $R_1$, is set up for the valve-opening comparator 53, while the valve-closing temperature, which is determined by the input voltage $VT_2$ and the resistance valve of the resistor $R_2$, is set up for the valve-closing comparator 54. The output of the valve-opening comparator 53 is conducted to an AND-gate $AND_3$ so as to open a leftward rotation limit switch $L_3$ and close the AND-gate $AND_3$, when the rotary movement of the rotary spool 45 reaches the leftward rotation limit. The output of the valve-closing comparator 54 is conducted to an AND-gate $AND_4$ so as to open a rightward rotation limit switch $L_4$ and close the AND-gate $AND_4$ when the rotary movement of the rotary spool 45 reaches the rightward rotation limit. The outputs of the AND-gates $AND_3$ and $AND_4$ are conducted to a distributor 56 with the output of a clock-pulse generator 55. The distributor 56 consisting of such members as a shift-resistor generates an exciting-phase signal for deciding the rotation direction of the stepping motor 58. The output of the clockpulse generator determines the driving-frequency of a stepping motor 58. The output of the distributor 56 is conducted to the motor-driving circuit 57 and excites a phase necessary to cause a rightward or leftward rotation of the stepping motor and to make the stepping motor 58 to rotate by a necessary angle. As the stepping motor 58 and the rotary spool 45 are interconnected as mentioned in FIG. 6, the rotary spool 45 rotates in accordance with the rotation of the stepping motor 58, whereby the cooling water from the radiator-side opening A and the cooling water from the by-pass-side opening B are mixed at an optional ratio and sent to the engine-side opening C.

Thus, when the output of the valve-opening comparator 53 or the valve-closing comparator 54 becomes an H level responding to a temperature detected by the thermistor 51, the stepping motor 58 rotates in accordance with the output of the AND-gate $AND_3$ or $AND_4$ and causes the rotation of the rotary spool 45 by an angle necessary to mix the water from the main water line with the water from the by-pass water line in an optional ratio.

Figure 8:
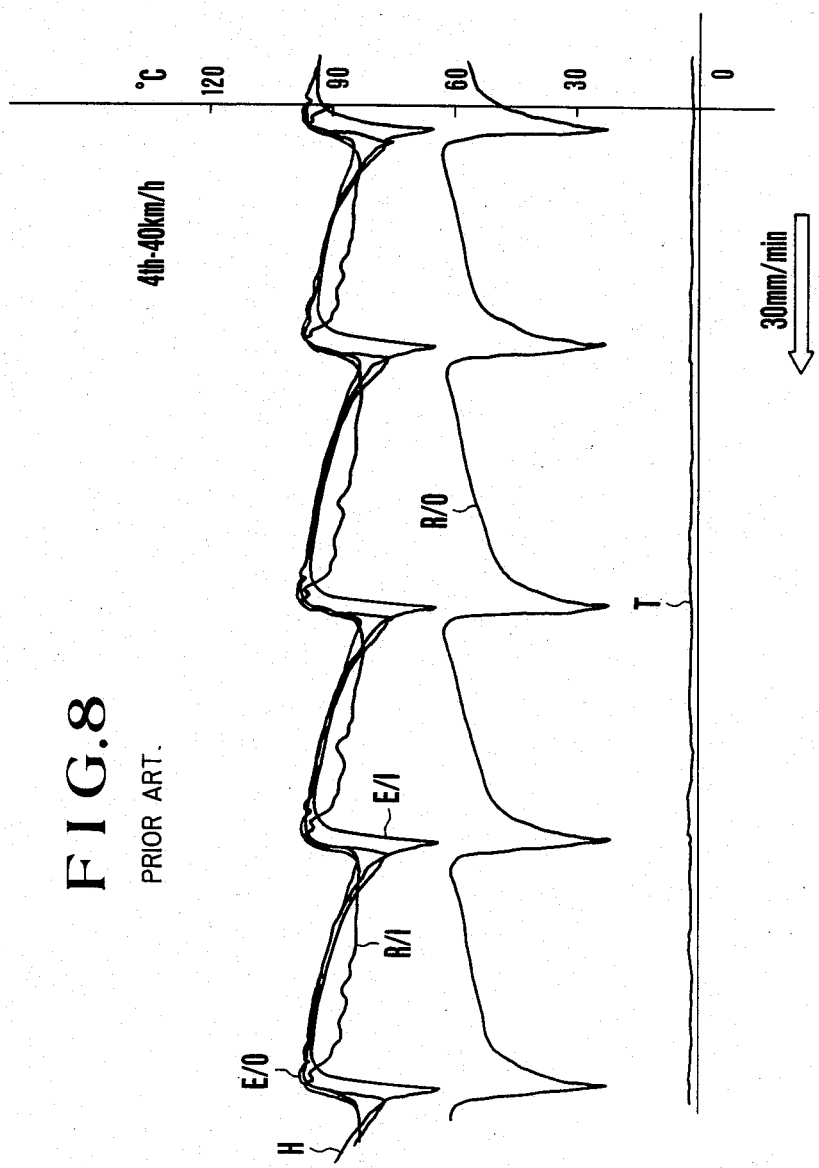
FIG. 8 shows the temperature characteristic curve of the conventional cooling system shown in FIG. 1.
Figure 9:
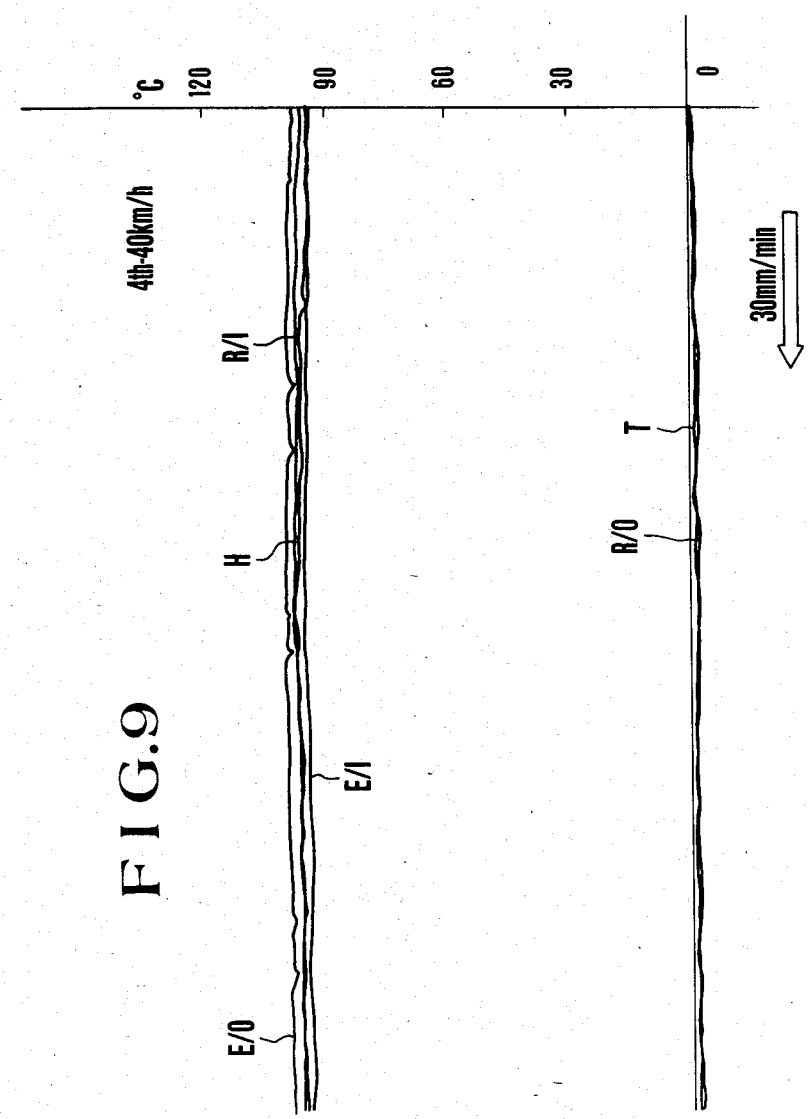
FIG. 9 shows the temperature characteristic curve of the cooling system in accordance with the present invention, shown in FIG. 3.

FIG. 8 shows the temperature characteristic curves of the engine cooling system of FIG. 1 under a running condition of 40 km/h with 4th speed. In FIG. 8, the curve H indicates the temperature at the engine head; the curve E/O indicates the temperature at the outlet from the engine; the curve E/I indicates the temperature at the inlet to the engine; the curve R/I indicates the temperature at the inlet to the radiator, the curve R/O indicates the temperature at the outlet from the radiator, and the curve T indicates the temperature of air detected by the sensor. The lower end point in the R/O curve shows a sharp temperature falling in the main water line 3 resulting from the closing of the wax-type thermostat. It will be understood by these curves that the temperature at the inlet of the engine varies in the range of about 30° C., while the temperature at the engine head and the outlet from the engine varies in the range of about 20° C., respectively in accordance with the variation of the cooling water temperature in the radiator. This means in turn that the temperature of the engine cylinder also varies and causes the variation of the burning condition in the engine and the lubrication condition between the cylinder and the piston. On the contrary, FIG. 9 shows the temperature characteristic curves of the engine cooling system in accordance with the present invention, in the case where the valve-opening temperature is set up to be 93° C. It will be understood that the temperatures at each portion of the cooling water line show only a little variation.

It should be understood that the preferred embodiment of the present invention has been described herein in considerable detail and that certain modifications, changes, and adaptations may be made therein by those skilled in the art and that it is hereby intended to cover all modifications, changes and adaptations thereof falling within the scope of the appended claims.

What is claimed is:

1. A system for cooling internal combustion engines comprising:
   a main cooling water line for circulating water through a radiator;
   a by-pass cooling water line diverging from said main cooling water line and circulating water without passing through the radiator;
   a motor-driven valve mechanism positioned for mixing the water from said main cooling water line with the water from said by-pass cooling water line in a mixture ratio controlled in accordance with the temperature of the cooling water to be supplied to the engine;
   a water temperature sensor arranged at a position close to a water inlet to the engine; and
   an electric control circuit for receiving the signal from said water temperature sensor and generating the signal to control the operation of said motor-driven valve mechanism,
   wherein said valve mechanism comprises a valve body, a spool inserted into said valve body and a direct current motor for driving said spool, said spool making an up-down movement between a first opening for the main cooling water line and second opening for the by-pass cooling water line, so as to regulate the water mixture ratio.

2. A system for cooling internal combustion engine of claim 1, wherein said electric control circuit includes a circuit for comparing a control target value with a signal value from the water temperature sensor and generating the signal for determining the rotation direction and rotation degree of the motor in accordance with whether said signal value is higher or lower than said target value, so as to control the mixture ratio of the water from the main cooling water line to the water from the by-pass cooling water line.

3. A system for cooling internal combustion engines comprising:
   a main cooling water line for circulating water through a radiator;
   a by-pass cooling water line diverging from said main cooling water line and circulating water without passing through the radiator;
   a motor-driver valve mechanism positioned for mixing the water from said main cooling water line with the water from said by-pass cooling water line in a mixture ratio controlled in accordance with the temperature of the cooling water to be supplied to the engine;
   a water temperature sensor arranged at a position close to a water inlet to the engine; and
   an electric control circuit for receiving the signal from said water temperature sensor and generating the signal to control the operation of said motor-driven valve mechanism,
   wherein said valve mechanism comprises a valve body, a spool inserted into said valve body and a stepping motor motor for rotatably driving said spool, said spool making a rotary movement between a first opening for the main water line and second opening for the by-pass cooling water line, so as to regulate the water mixture ratio.

4. A system for cooling internal combustion engines of claim 3, wherein said electric control circuit includes a circuit for comparing a control target value with a signal value from the water temperature sensor and generating the signal for determining the rotation direction and rotation degree of the motor in accordance with whether said signal value is higher or lower than said target value, so as to control the mixture ratio of the water from the main cooling water line to the water from the by-pass cooling water line.

* * * * *